United States Patent
Biecker et al.

(10) Patent No.: US 6,688,670 B2
(45) Date of Patent: Feb. 10, 2004

(54) CONVERTIBLE ROOF OF A CONVERTIBLE MOTOR VEHICLE

(75) Inventors: Peter Biecker, Oberhaching (DE); Marco Lauterbach, Kasendorf (DE); Gerhard Schwarz, Planegg (DE); Fritz Wegener, Gilching (DE); Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/073,350

(22) Filed: Feb. 13, 2002

(65) Prior Publication Data

US 2002/0175536 A1 Nov. 28, 2002

(30) Foreign Application Priority Data

Feb. 13, 2001 (DE) .......................................... 101 07 077

(51) Int. Cl.⁷ .................................................. B60J 7/14
(52) U.S. Cl. ............................. 296/107.18; 296/107.19; 296/107.2; 296/108
(58) Field of Search ..................... 296/107.18, 107.2, 296/108, 117

(56) References Cited

U.S. PATENT DOCUMENTS 5,769,483 A    6/1998  Danzl et al.
6,419,296 B2 * 7/2002  Dintner et al. ......... 296/107.18

FOREIGN PATENT DOCUMENTS

DE            44 35 222 C1    11/1995

* cited by examiner

Primary Examiner—Dennis H. Pedder
(74) Attorney, Agent, or Firm—Nixon Peabody LLP; David S. Safran

(57) ABSTRACT

A convertible roof (2) of a convertible motor vehicle with at least one front roof part which is movably supported on the body by a bearing (8), and a rear roof part (13) which can be moved over the front roof part (5) and can be lowered with it into a rear stowage space (3). An especially simple structure can be achieved when the rear roof part (13) on the front side can be moved over the front roof part (5) by a raising mechanism (27) which is movably supported on a lengthwise guide (32) which is located on the front roof part (5). A carriage (31) can be guided on the lengthwise guide (32) of the front roof part (5) and the raising lever (28) of the raising mechanism, which lever is pivotally connected to the rear roof part (13), is supported on the carriage to be able to pivot and to be moved by the raising mechanism.

15 Claims, 18 Drawing Sheets

CONVERTIBLE ROOF OF A CONVERTIBLE MOTOR VEHICLE

BACKGROUND OF THE INVENTION

1. Field of the Invention

The invention relates to the convertible roof of a convertible motor vehicle with at least one front roof part which is movably supported on the body by a bearing means, and a rear roof part which can be moved over the front roof part and can be lowered with it into a rear stowage space.

2. Description of Related Art

German Patent DE 44 35 222 C1 and corresponding U.S. Pat. No. 5,769,483 disclose a motor vehicle roof with a front roof part and a rear roof part of the initially mentioned type. The front roof part, which can be locked on the windshield apron via side roof members which can be swung in, is pivotably coupled to the body by means of a pivot lever. Via a pivot lever which is supported on the body and which can be pivoted by means of a hydraulic cylinder and is coupled via another hydraulic cylinder to the rear coupling point of the rear roof part to the latter, and with an additional hydraulic cylinder and a telescoping guide which is parallel to it which, on the one hand, is attached to the pivot lever, and on the other, engages the rear roof part at the front coupling point, the rear roof part, which rearwardly adjoins the front roof part and sits on the flap of the soft top compartment which forms the transition to the trunk to form a seal, is movably supported such that by pivoting and actuating the lever and hydraulic cylinder means, the roof can be raised out of its closed and can be swung forward to over the front roof part. Then, the rear roof part is locked on the front roof part, and after unlocking the roof rods and by actuating the lever and hydraulic cylinder means, it is swung as a unit with the front roof part to the rear into a stowage space and deposited in it. In doing so, the front roof part pivots according to guidance by its pivot rod and by the lever and hydraulic cylinder means of the rear roof part. However, this arrangement of the lever and hydraulic cylinder means has a complex structure, demands a large amount of space, and requires a lateral elongated recess for passage of the lever and hydraulic cylinder means in the flap of the soft top compartment.

SUMMARY OF THE INVENTION

A primary object of the present invention is to provide a motor vehicle roof of the initially mentioned type with a simplified and improved lowering mechanism.

This object is achieved in accordance with the invention in that the front side of the rear roof part can be moved over the front roof part by a raising means which is movably supported on a lengthwise guide which is located on the front roof part. Since the raising means executes lengthwise motion of the rear roof part over the front roof part by displacement along the lengthwise guide, the rear roof part need be raised only slightly above the front roof part. In doing so, the front section of the front roof part is securely supported via the raising means over a short length on the lengthwise guide. Due to the short support, the rear roof part pivots only a little beyond the front roof part. Driving can take place with comparatively low drive force by means of a drive part which is movably supported on the lengthwise guide.

The raising means in accordance with the invention is especially suitable for a rear roof part which has side roof members or C columns, and thus, forms the completely closed rear roof shell of the motor vehicle roof, which can also be called a C segment. The rear roof part can also contain a rear window.

Functionally, the rear roof part is supported on the back, i.e., behind the raising means by a connecting rod means to be able to pivot on the front roof part or the bearing means. The connecting rod means on each side of the roof contains, for example, a connecting rod which is coupled to the back end or to the back window frame of the rear roof part.

Alternatively, the rear roof part can be supported in the rear by means of a pivot joint on the support lever which is movably supported on the guide rail. Since the support lever does not execute a pivoting motion at its foot, but it is movably guided only in the lengthwise guide, this support has high stiffness. The guide rail for the support lever can be divided into a front guide rail on the front roof part and into a rear guide rail on a main connecting rod which movably supports the front roof part. As soon as the support lever has been pushed onto the front guide rail, the main connecting rod can be pivoted to lower the roof.

One preferred embodiment of the invention calls for the carriage to be guided on the lengthwise guide of the front roof part and for the raising lever of the raising means, which lever is connected to be able to pivot relative to the rear roof part, to be supported on the carriage to be able to pivot and to be moved by the raising mechanism. In doing so, the control pin of the raising lever, which is intended for raising of the raising lever, can be guided on the control crank on the front roof part.

Functionally, the drive motor mounted on the front roof part or on the support frame of the roof part is connected via a drive cable to the respective carriage of the raising means which are located on both sides on the front roof part.

In order to equalize positional deviations between the right and the left drive cable for the right-side and the left-side raising mechanism, the control pin is preferably located in the end section of its lengthwise guide at dead center with respect to the carriage. The carriage thus causes almost no motion or pivoting of the raising lever on its final path of motion.

According to another preferred embodiment, the raising lever of the raising means on the lengthwise guide of the front roof part, which lever is pivotally connected to the rear roof part, is guided over two bearing parts which are spaced away from one another and which are movably guided on the lengthwise guide, and by means of the curved shape of the lengthwise guide, the respective pivot position of the raising lever is set. This version has an especially simple structure and is reliable in operation.

According to another preferred embodiment, the guide means of the raising mechanism on the front roof part contains two lengthwise guides for respective bearing parts which are movably supported thereon; that is, the bearing part of the raising lever which is pivotally connected to the rear roof part, and the raising section of the lengthwise guides which is on the end at the time executes a initial pivoting motion of the raising lever. The swinging-out motion of the raising lever can be carried out by the driven bearing part being guided in the circuit-shaped raising section of the first lengthwise guide, while the other bearing part remains in the other lengthwise guide at the center of the circle. After carrying out the pivoting motion, the two bearing parts are pushed on the lengthwise guides and retain their relative positioning without additional pivoting so that the lifted raising lever can be moved along the front roof part.

Functionally, the driven bearing part is driven by a drag lever which can be connected to the drive motor via a drive carriage which is movably guided in its own drive guide and via a drive cable.

The raising means as claimed in the invention is suited for motor vehicle roofs with different fixed roof elements, especially the front section of the motor vehicle roof can have a movable cover, for example, an externally guided sliding and lifting roof cover, in front of the front roof part.

Embodiments of the invention are explained in detail below with reference to the accompanying drawings.

DETAILED DESCRIPTION OF THE INVENTION

Figure 1:
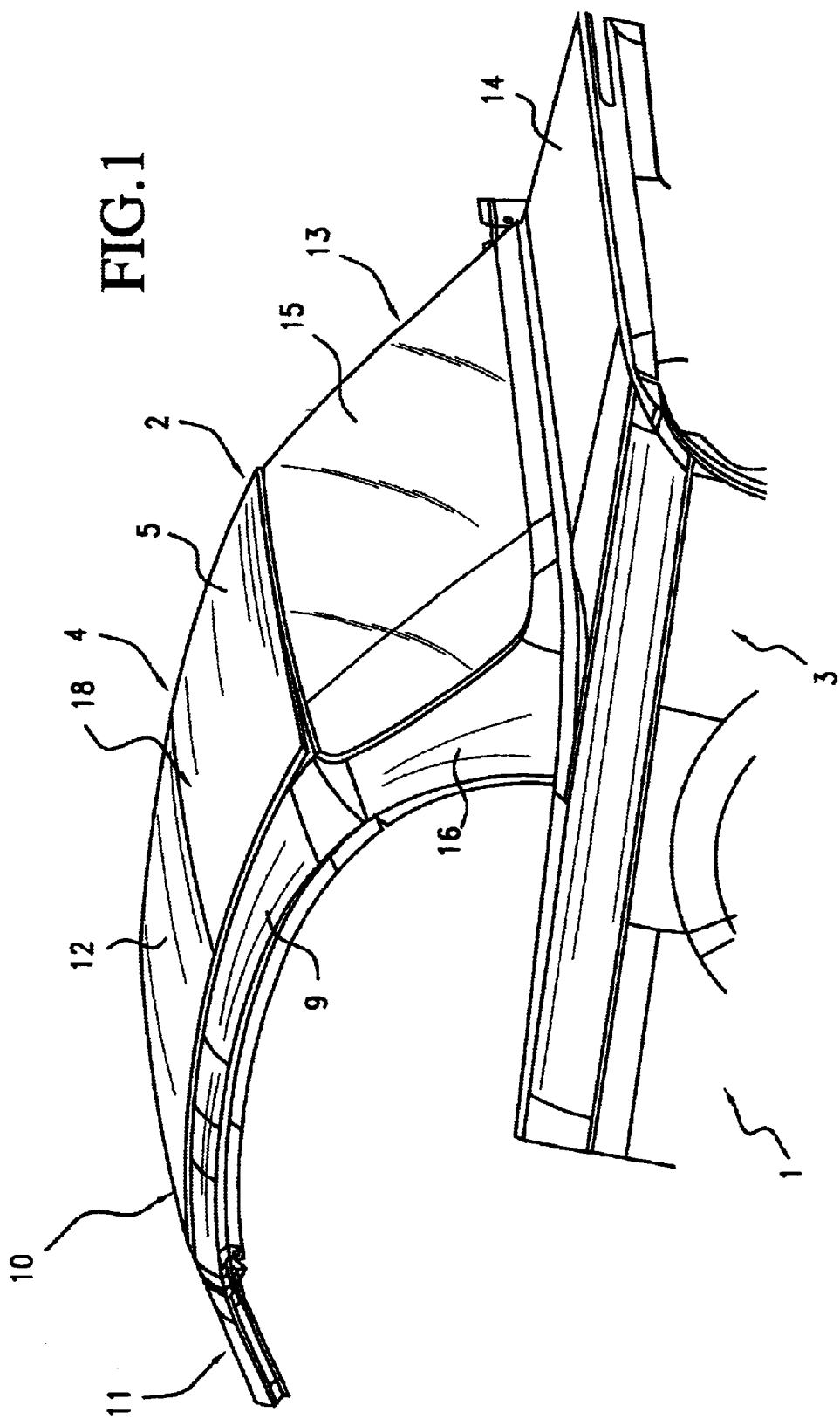
FIG. 1 is a perspective view in a partial representation the left half of the convertible hardtop roof of a convertible motor vehicle in the closed position.

A motor vehicle 1 has a convertible motor vehicle roof 2 comprised rigid panels or a soft top on a frame of rigid elements, which roof can be transferred out of the closed position (FIG. 1) in which it covers the vehicle interior into a rear stowage space or compartment 3, by which the motor vehicle 1 can be converted into an open convertible (the stowed position of the motor vehicle roof is not shown).

Figure 3:
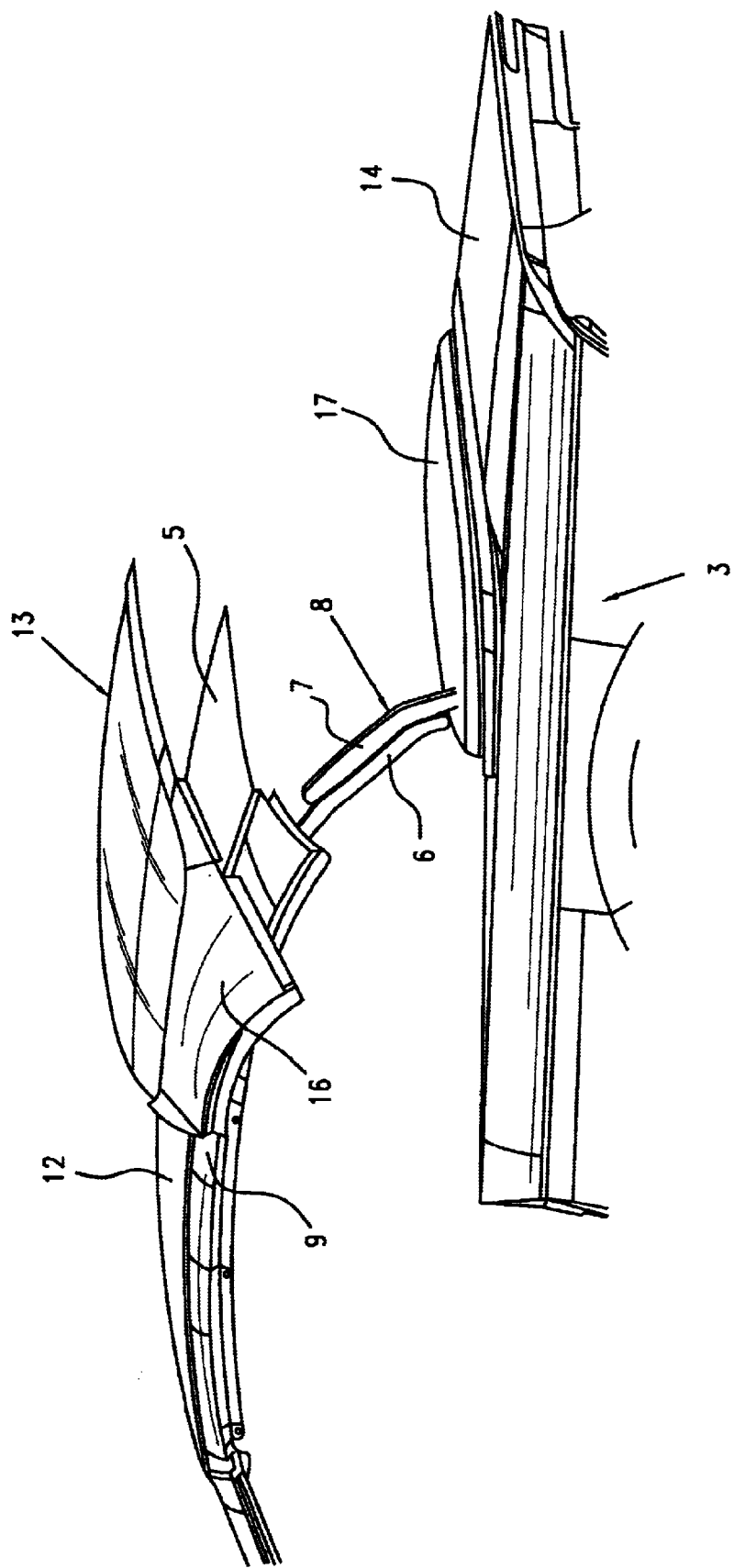
FIG. 3 is a perspective view of the motor vehicle roof shown in FIG. 1 with the rear roof part being located in the end position on the front roof part.

The front section 4 of the motor vehicle roof 2 contains a front roof part 5 which is pivotally supported by a four joint linkage arrangement 8 (see FIG. 3) which has a main column 6 and a main connecting rod 7 connected to the body, side roof members 9 which are located on both sides next to the front roof part 5 and which extend forward beyond the front roof part 5 as far as to the front cross beam or apron 10 on the top edge of the front window 11 and can be coupled to it in a detachable localization, and a cover 12 which is located between the front roof part 5 and the cross beam 10, which is movably supported on the lateral guides on the two opposing side roof members 9 and, for at least partial opening of a roof opening depending on the version, can be pushed to the rear to over or under the front roof part 5. The motor vehicle roof 2 is described using the left roof half facing the viewer and the pertinent left-side bearing means, of course also the correspondingly built opposite right half of the motor vehicle roof also having these bearing means.

Figure 2:
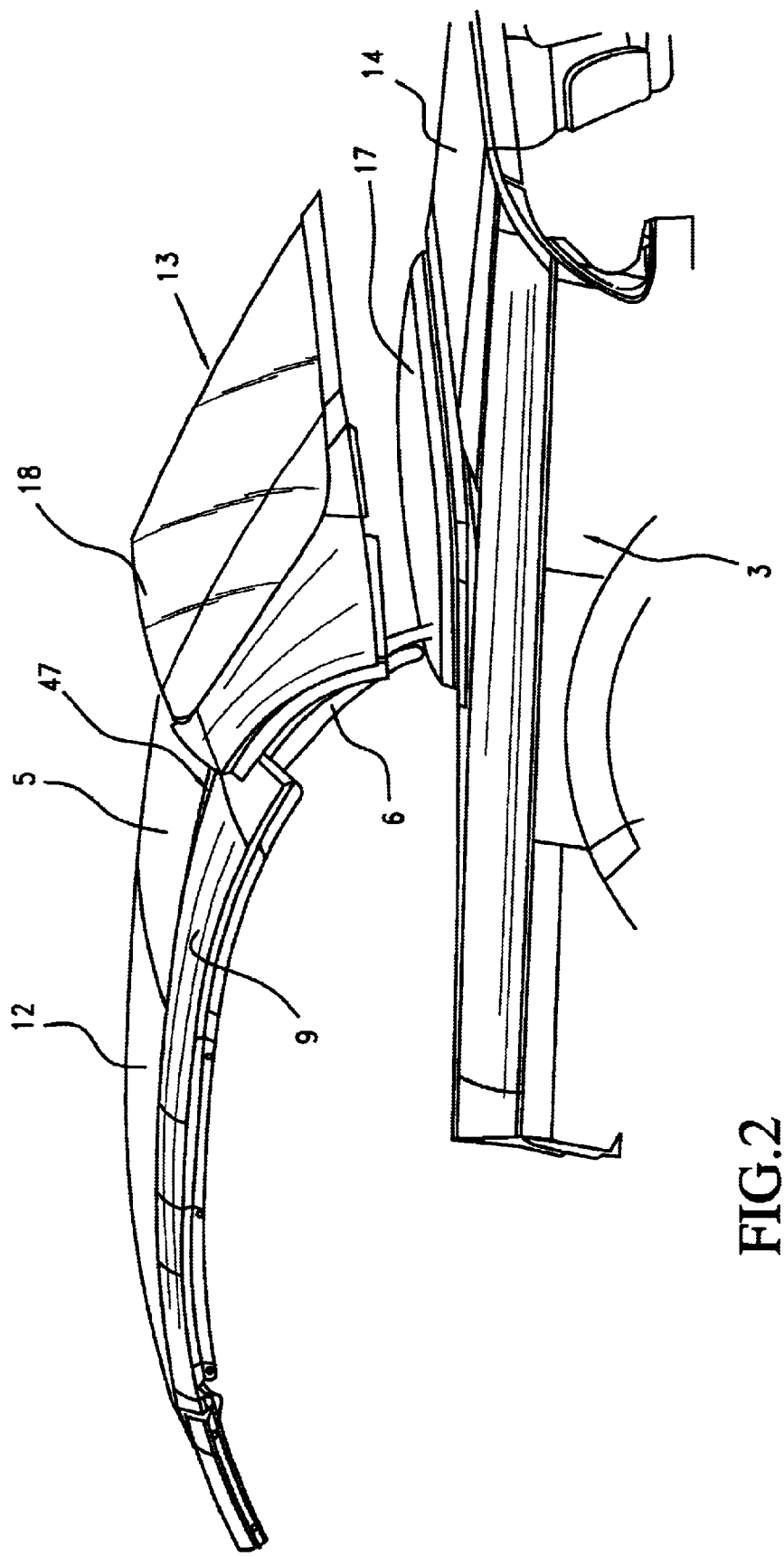
FIG. 2 is a perspective view of the motor vehicle roof shown in FIG. 1 in the first position of movement of the rear roof part.

The rear roof part 13 which forms the rear section of the motor vehicle roof 2 extending to the trunk lid 14, which has a rear window 15, and side roof members or C columns 16 located on the side edges. With the motor vehicle roof 2 closed, the rear roof part rests tightly on the cover 17 of the roof compartment, which cover forms a hat rack, i.e., shelf behind the rear seat (see FIG. 1). The motor vehicle roof 2 is movably supported by a bearing means on the front roof part 5 such that it is raised out of its closed position (see FIG. 1) with its front edge 18 extending over the front roof part 5 (see FIG. 2), and it can be positioned in a deposition position over the front roof part 5 (see FIG. 3). In this deposition position, the motor vehicle roof 2 can be lowered, after releasing the side roof members 9 from the cross beam 10 and after moving the cover 12 back onto or to under the front roof part 5, into the compartment 3. The side roof members 9 can be formed of two or more components which can be divided in the lengthwise direction and pivoted or folded in the lengthwise direction for shortening their deposition length. The compartment cover 17 is swung up before the motor vehicle roof 2 is lowered.

Figure 4:
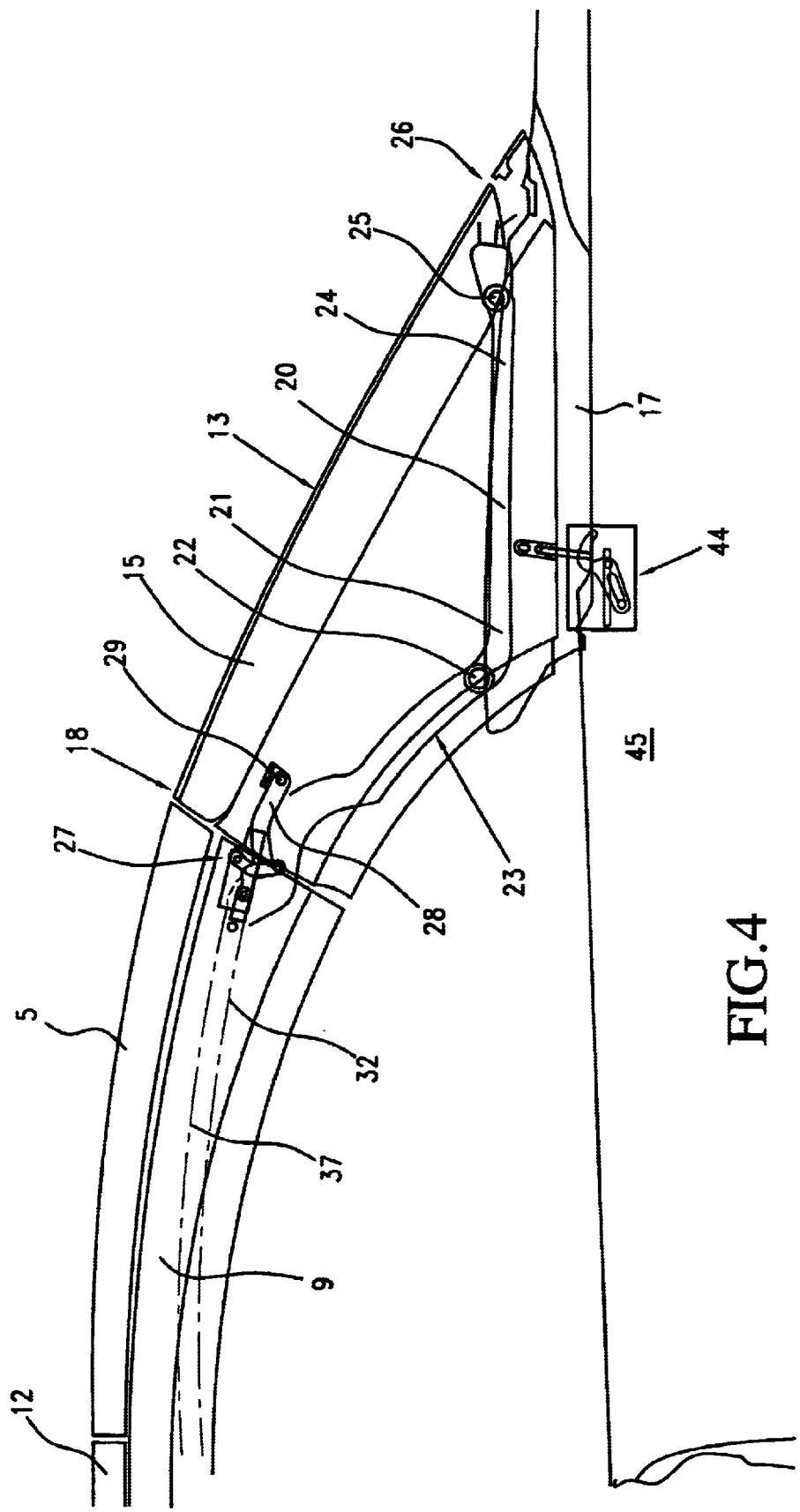
FIG. 4 is a side view showing a schematic of the motor vehicle roof of FIG. 1 in the closed position with a first embodiment of a bearing means for the rear roof part.

The bearing means for the rear roof part 13, on the right side and left side, each contains a connecting rod 20 (see FIG. 4) which is pivotally supported with its front end 21, i.e., the end which located forward in the closed position of the roof, by means of a pivot bearing 22 on the bearing part 23 which is securely connected to the front roof part 5. The back end 24 of the connecting rod 20 is pivotally coupled by means of a pivot bearing 25 in the area of the back edge 26 of the rear roof part 13, for example, toward the bottom frame of the rear window 15.

Figure 5:
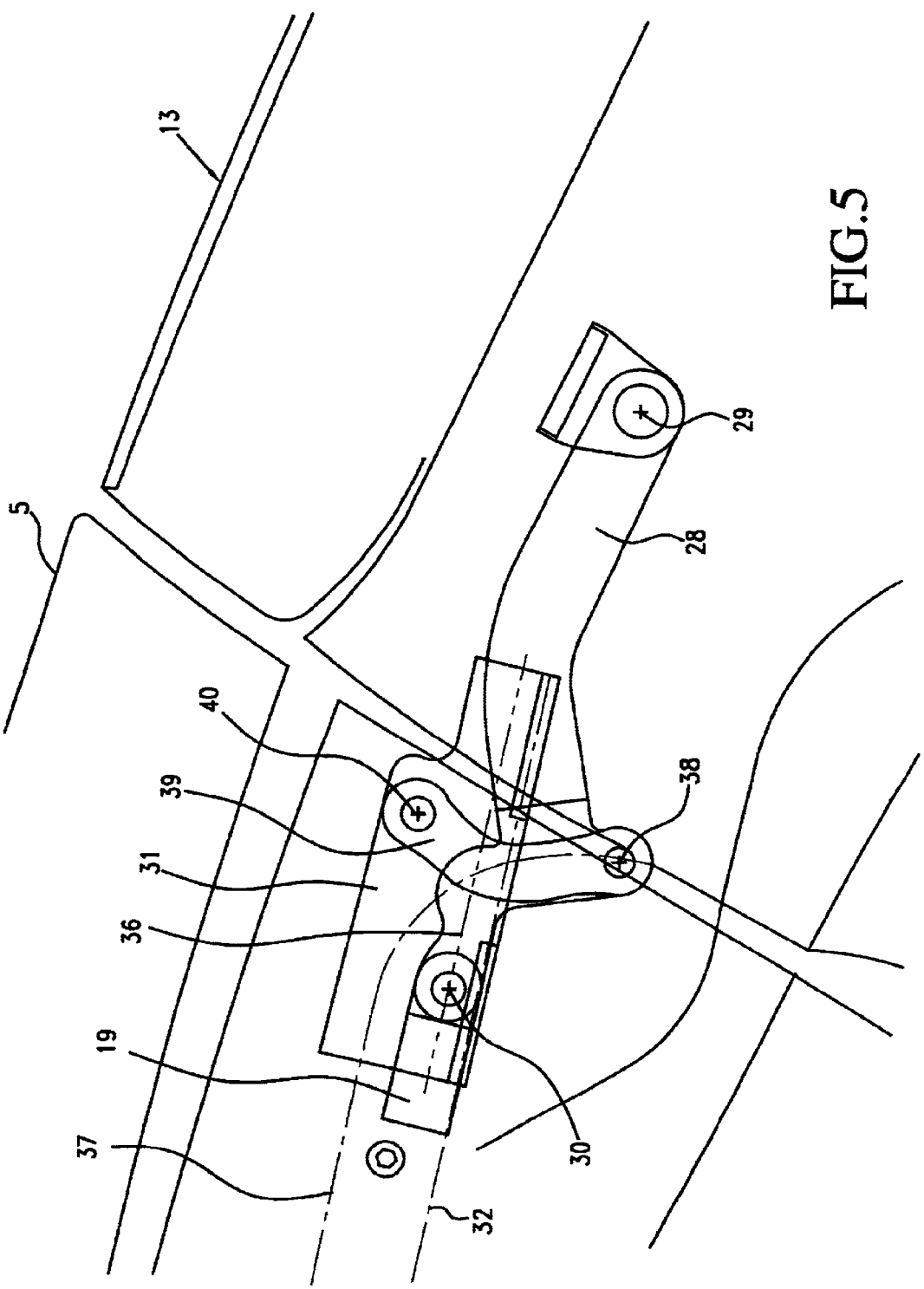
FIG. 5 is an enlarge side view of the bearing means for the rear roof part as shown in FIG. 4.
Figure 6:
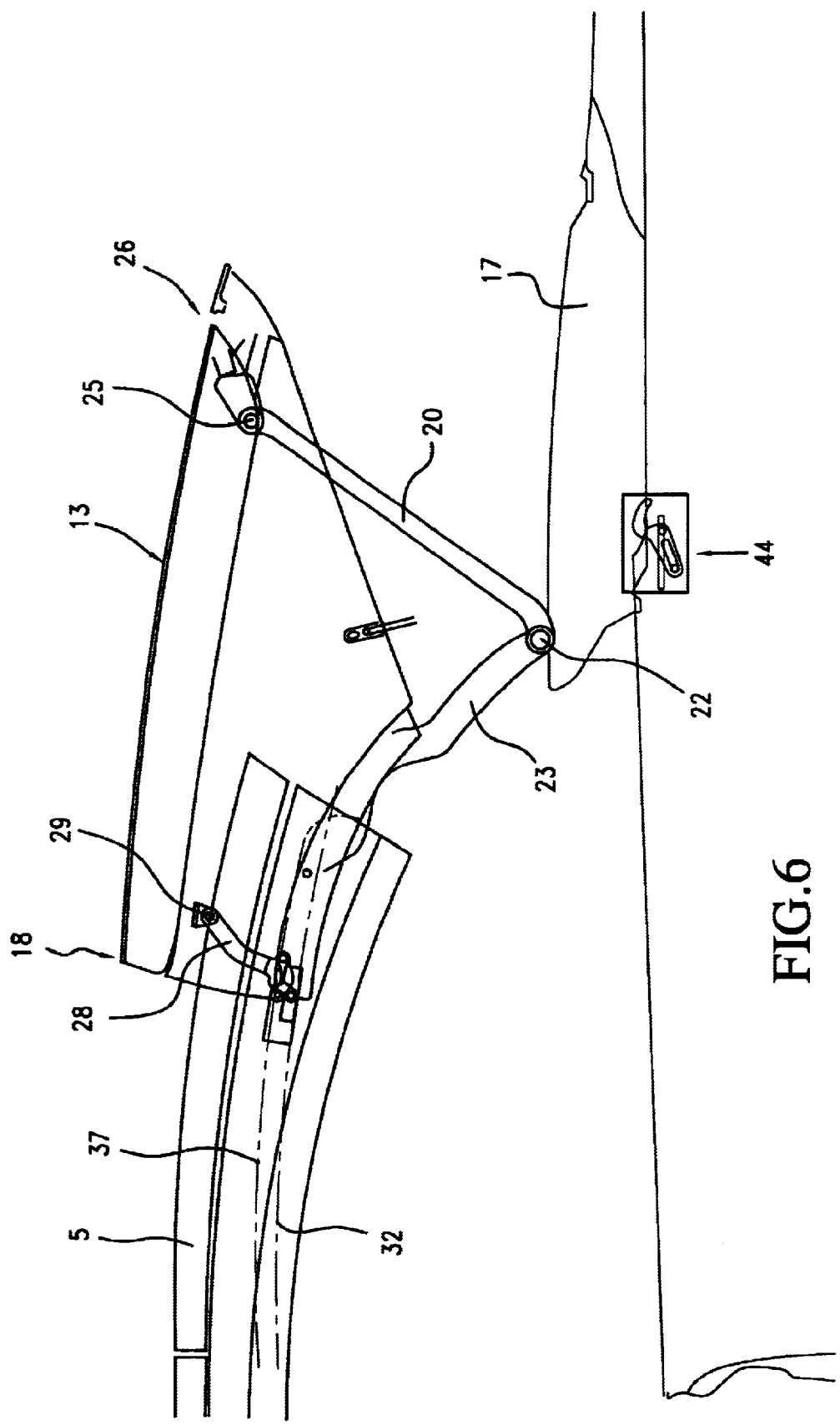
FIG. 6 is a side view of the motor vehicle roof with the rear roof part raised over the front roof part.
Figure 7:
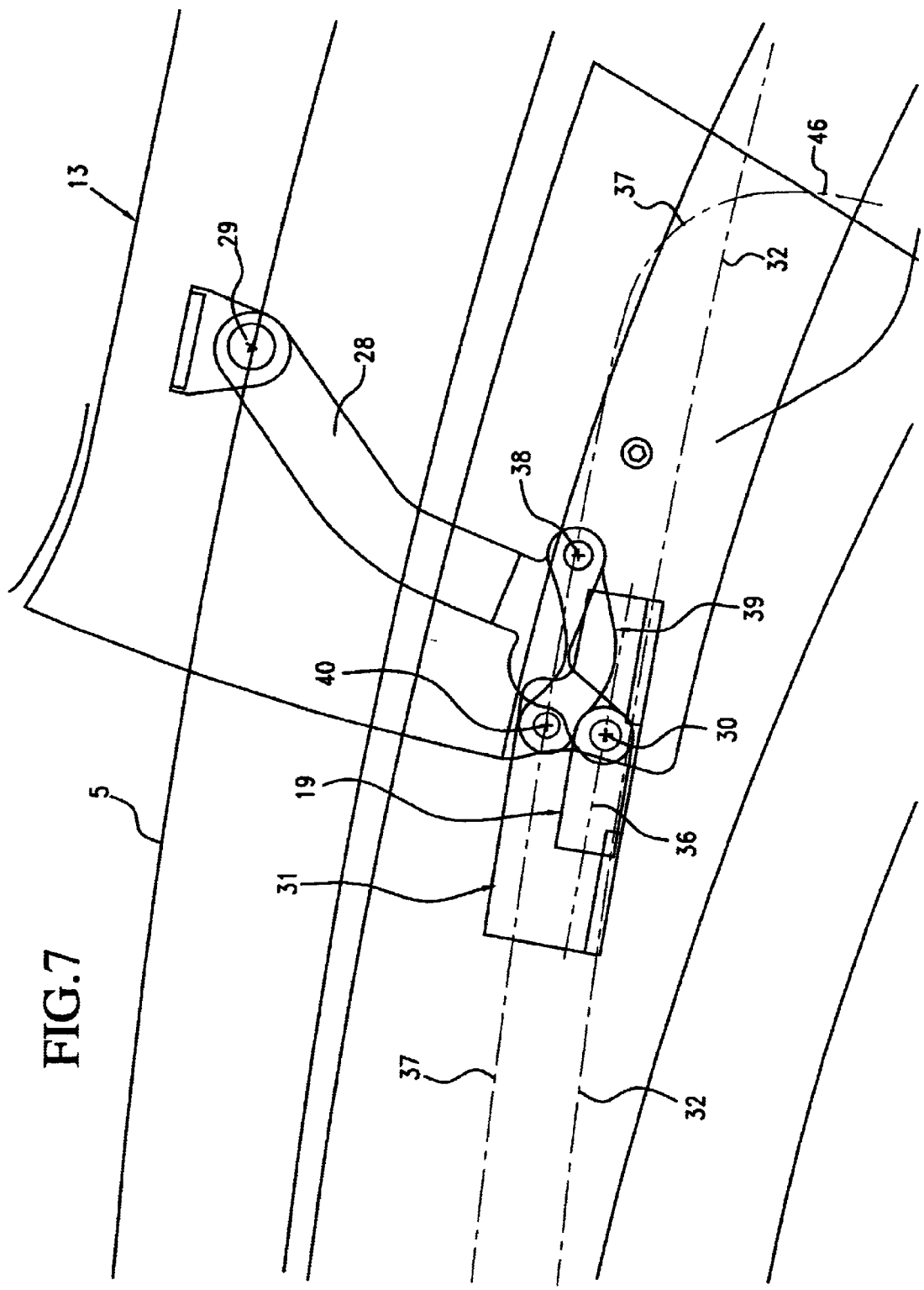
FIG. 7 is an enlarged side view of the bearing means shown in FIG. 6 with the rear roof part raised.
Figure 8:
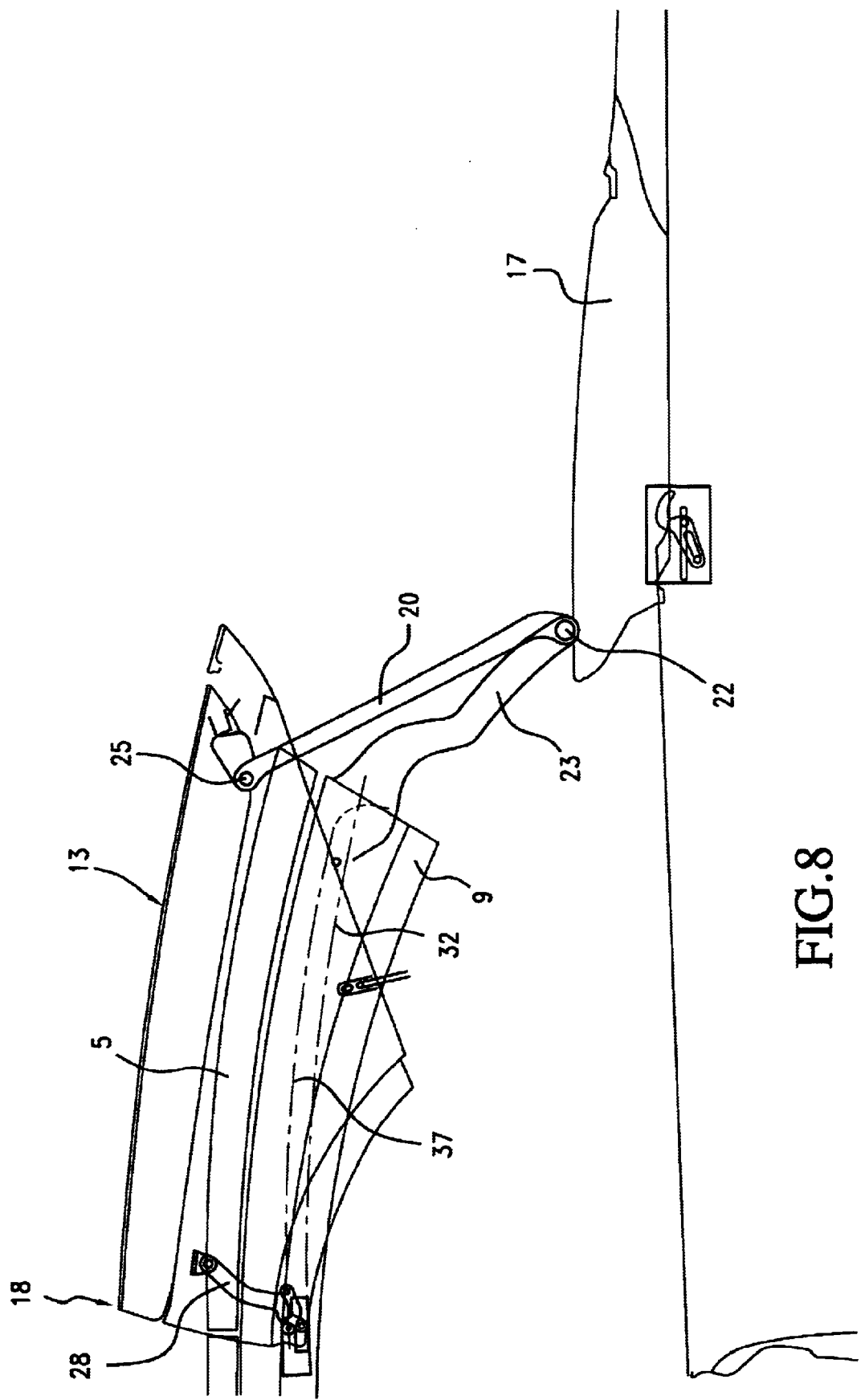
FIG. 8 is a side view of the motor vehicle roof with the rear roof part pushed forward over the front roof part.
Figure 9:
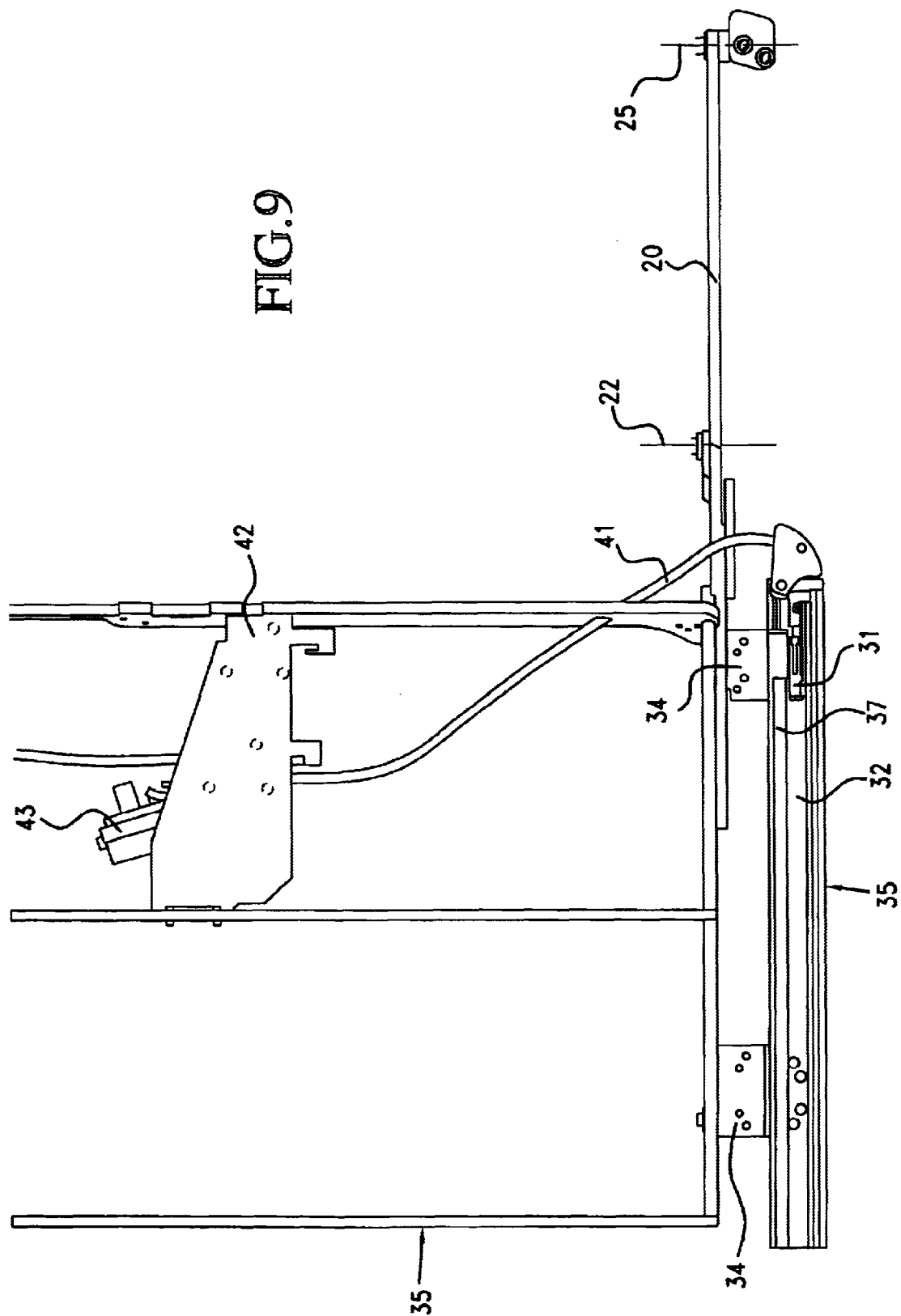
FIG. 9 is a plan view of the support frame of the front roof part with the bearing means for the rear roof part.
Figure 10:
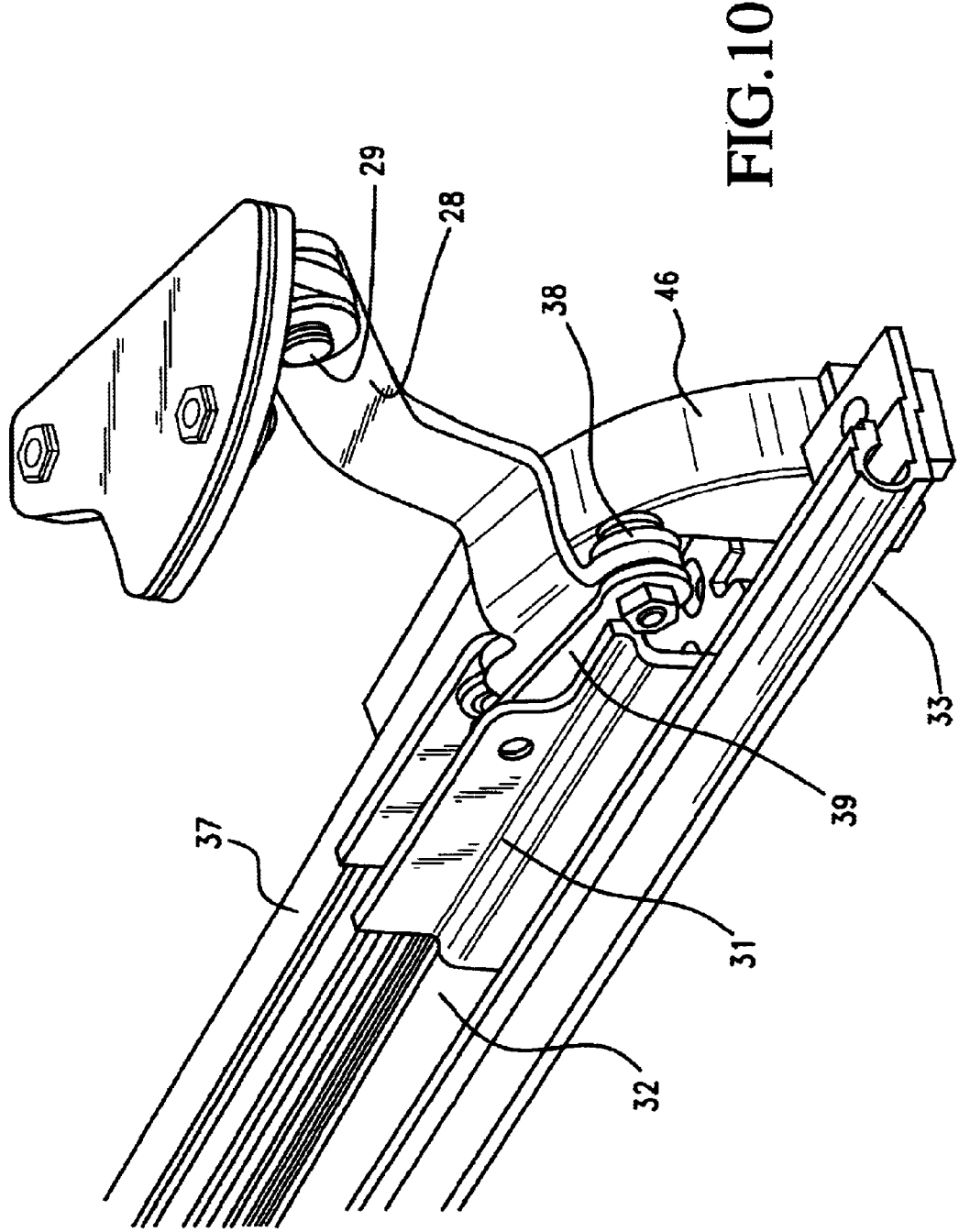
FIG. 10 is an enlarged perspective view of the bearing means for the rear roof part.

Furthermore, the bearing means for the rear roof part 13 contains a front bearing mechanism 27 which lifts the front edge 18 of the rear roof part 13 out of its closed position and moves it forward over the front roof part 5. The bearing mechanism 27, according to a first embodiment (see FIGS. 4 to 10), has a raising lever 28 which, on the one hand, is pivotally supported in the pivot joint 29 in the forward area of the rear roof part 13, and on the other hand, is support in the pivot bearing 30 (see FIG. 5) on a carriage 31 which can be moved on the lengthwise guide 32 of a guide rail 33. The guide rail 33 is attached laterally to the front roof part 5 by means of two retaining plates 34 on the support frame 35 of the front roof part 5 (see FIG. 9). The pivot bearing 30 of the raising lever 28 is supported on the carriage 31 by means of a sliding piece 19 which can be moved on the carriage 31 along an equalization path 36 relative to the carriage 31.

On the guide rail 33, there is a second lengthwise guide or control slot 37 in which a control pin 38, which is permanently mounted on the raising lever 28, is movably held. The control pin 38 engages a drag lever 39 which is pivotally mounted on the carriage 31 at a joint 40. The carriage 31 is connected to a drive motor 43 by a compressively stiff drive cable 41 (see FIG. 9), which is made in the manner of a Bowden cable. The drive motor 43 is mounted on the support frame 35 of the front roof part 5 by means of a motor carrier 42 and moves the carriage 31 along the lengthwise guide 32.

To lower the motor vehicle roof 2, first a locking means 44 (see FIGS. 4 & 6), which keeps the rear roof part 13 locked in the closed position on the side wall 45 of the body, is unlocked. Then, via actuation of the electric drive motor 43, the respective carriage 31 is moved forward on the bilateral guide rails 33 by means of the drive cable 41, the drag lever 39 moving the control pin 38, which is located initially on the lower end of the downwardly curved end section 46 of the second lengthwise guide 37 (see FIG. 4), on the curved path of the end section 46, up to the forwardly adjoining section of the second lengthwise guide 37, which section runs lengthwise. As a result of the kinematics, the control pin 38 is raised to a level above the front pivot joint 30 of the raising lever 28 (see FIGS. 6 and 7) so that the raising lever 28 is swung up, and in doing so, raises the front edge 18 of the rear roof part 13 over the front roof part 5. Since the control pin 38 is moved on a path around the joint 40 of the drag lever 39, the pivot joint 30 of the raising lever 28 executes a backwardly directed equalization motion along the equalization path 36 relative to the carriage 31. When the rear roof part 13 is swung up and subsequently moved over the front roof part 5 as a result of the carriage 31 continuing to move forward, the connecting rod 20 necessarily executes a pivoting-out motion of the rear edge 26 of the rear roof part 13 (see, for example, FIG. 6).

The length of the raising lever 28 is chosen such that the front edge 18 of the rear roof part 13 is lifted a short distance over the front roof part 5. The raising lever 28 which is pivoted up moves in a slotted gap 47 between the roof skin of the front roof part 5 and the side roof member 9 (see FIG. 2). Alternatively, the side roof member 9 can be movably supported relative to the front roof part 5 such that, before the raising lever 28 is pivoted up, the side roof member 9, which directly adjoins the front roof part 5, is moved outwardly away from the roof part 5 to form a slot-shaped gap for the raising lever 28.

Further opening and deposition of the motor vehicle roof 2 take place in the initially described manner. The closing process of the motor vehicle roof 2 takes place in the reverse sequence of motions.

When the motor vehicle roof 2 is being closed, while the carriage 31 is moving on the last segment of its path, the control pin 38 moves on the lower end of the end section 46 of the second lengthwise guide 37, which end runs downward essentially at a right angle relative to the lengthwise guide 32. Displacement of the carriage 31 in this section causes almost no displacement of the control pin 38, and thus, no pivoting of the raising lever 28. In this way, play or a fabrication deviation between the right and the left drive cable 41 can be equalized so that exact, symmetrical end positioning of the two drive cables 41 or the carriage 31 is not necessary.

Figure 11:
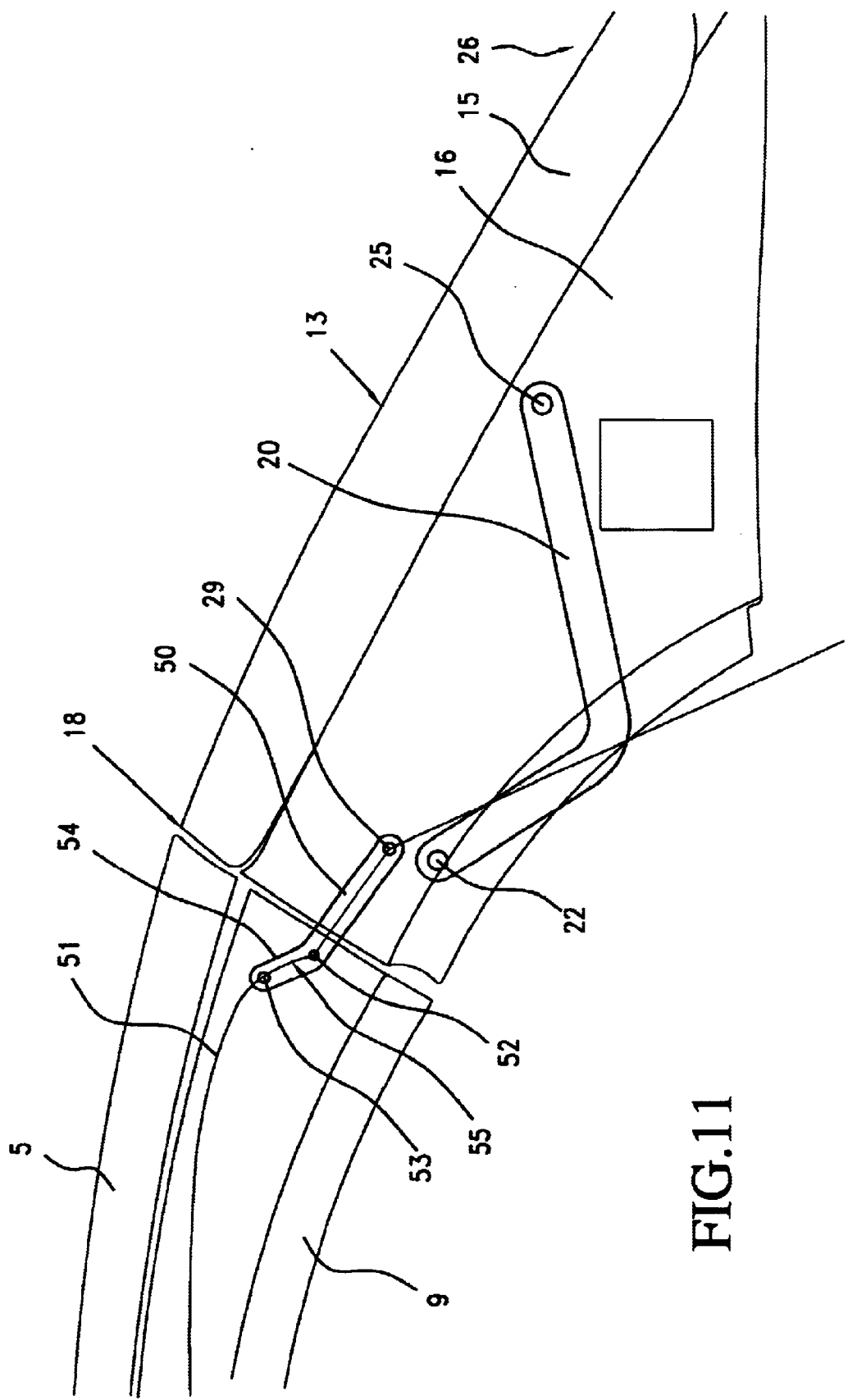
FIG. 11 is a schematic side view of a portion the motor vehicle roof shown in FIG. 1 in the closed position with a second embodiment of a bearing means for the rear roof part.
Figure 12:
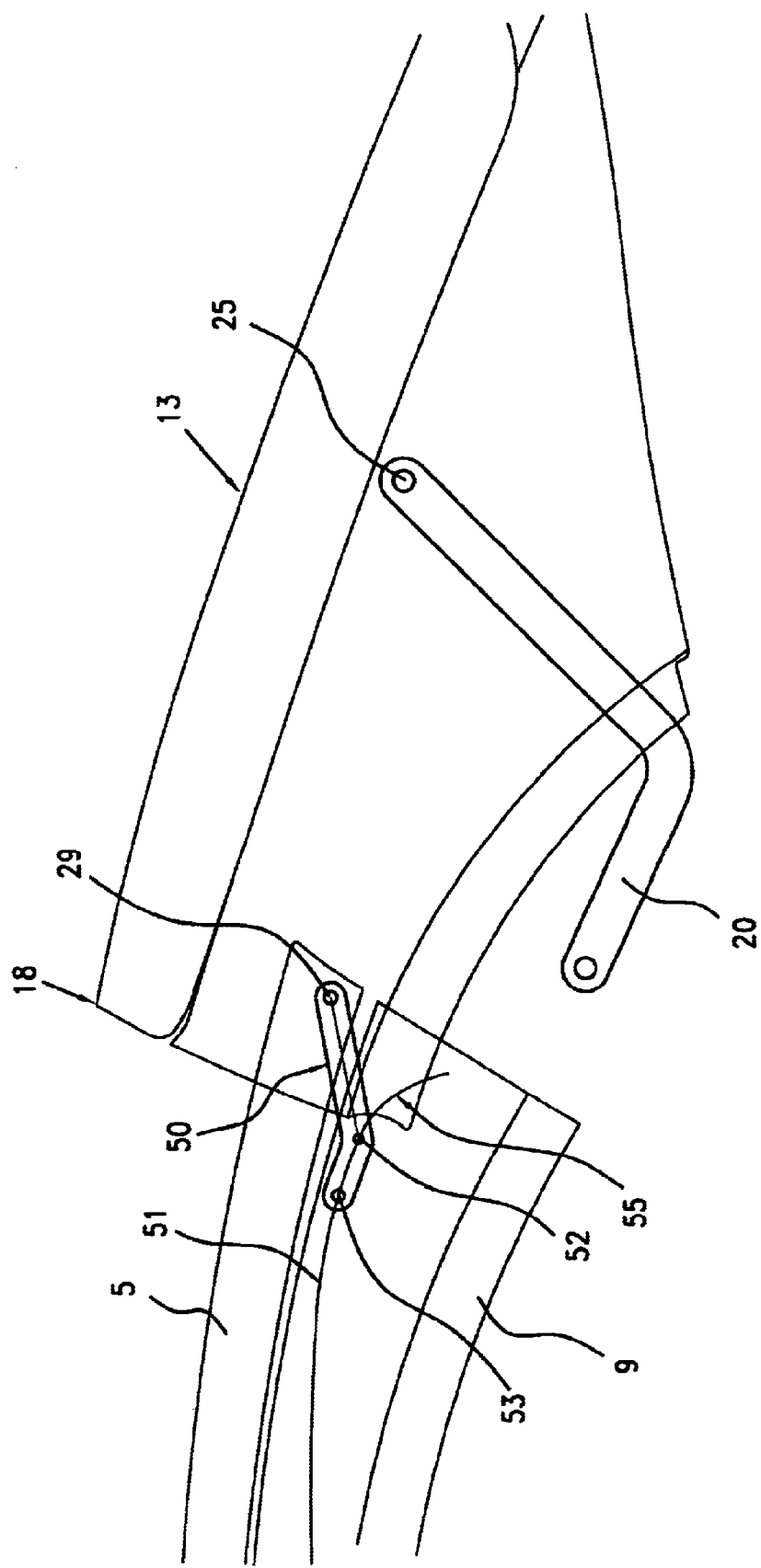
FIG. 12 is a side view of a portion of the motor vehicle roof with the bearing means as shown in FIG. 11 with the rear roof part raised.

In a second embodiment (see FIGS. 11 & 12), the raising lever 50 is movably supported on the front roof part 5 on the lengthwise guide 51 of the guide rail by means of two bearing parts 52, 53 which are spaced apart from one another on the bearing end 54 of the raising lever 50, which end is adjacent to the front roof part 5. The lengthwise guide 51 has a path which is curved dramatically downward on its back end section 55. When the raising lever 50 is pushed forward out of its end position (FIG. 11) via the drive cable which is connected to the bearing parts 52, 53, initially it is swung up according to the curved path of the lengthwise guide 51, first of all, such that by means of the pivot joint 29 the front edge 18 of the rear roof part 13 is raised over the front roof part 5 (FIG. 12) and over the continuing course the rear roof part 13 is pushed forward over the front roof part 5. The rear edge 26 of the rear roof part 13 is raised via the connecting rod 20 in the manner described in the preceding examples.

Figure 13:
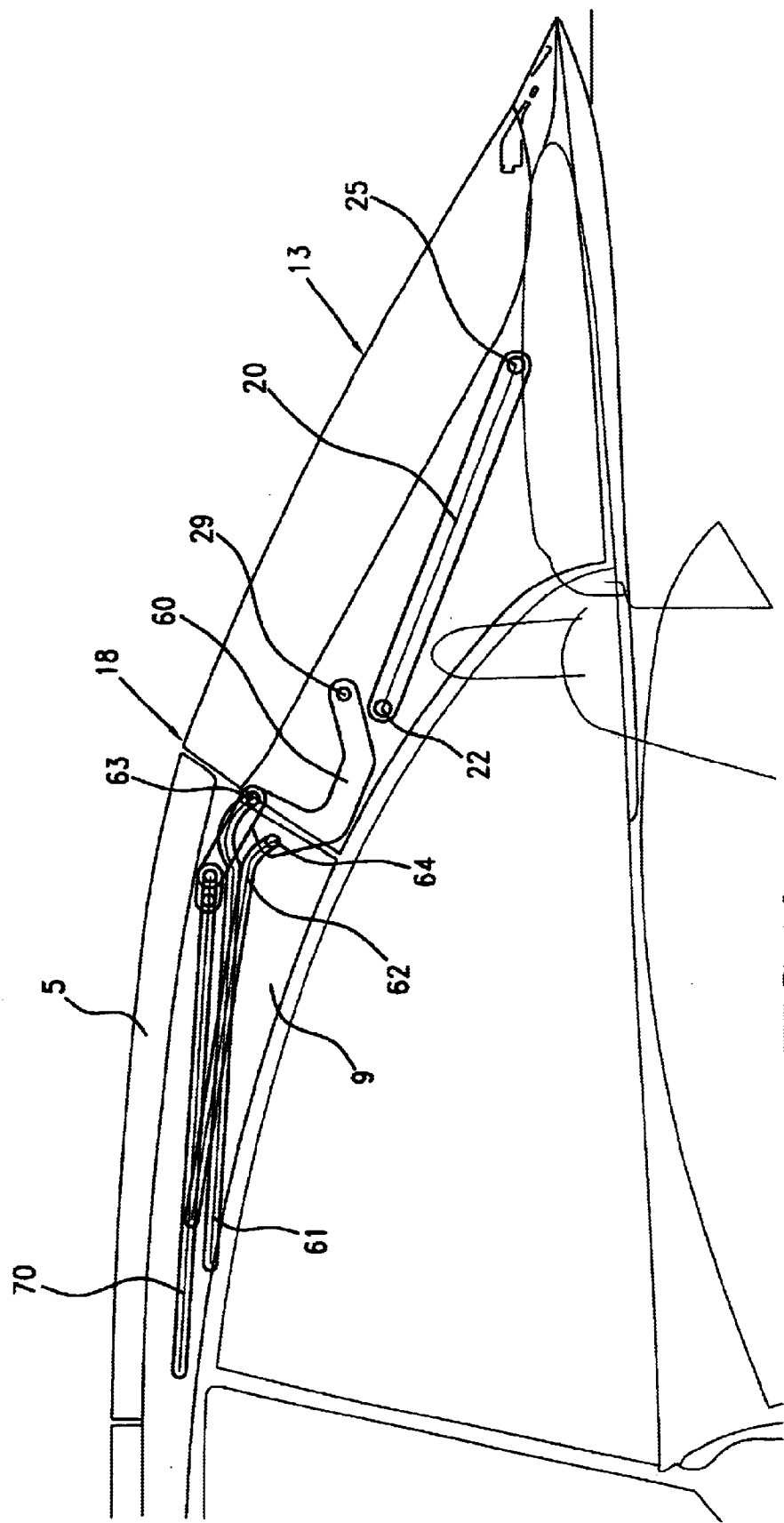
FIG. 13 is a side view of a portion of the motor vehicle roof shown in FIG. 1 in the closed position with a third embodiment of a bearing means for the rear roof part.
Figure 14:
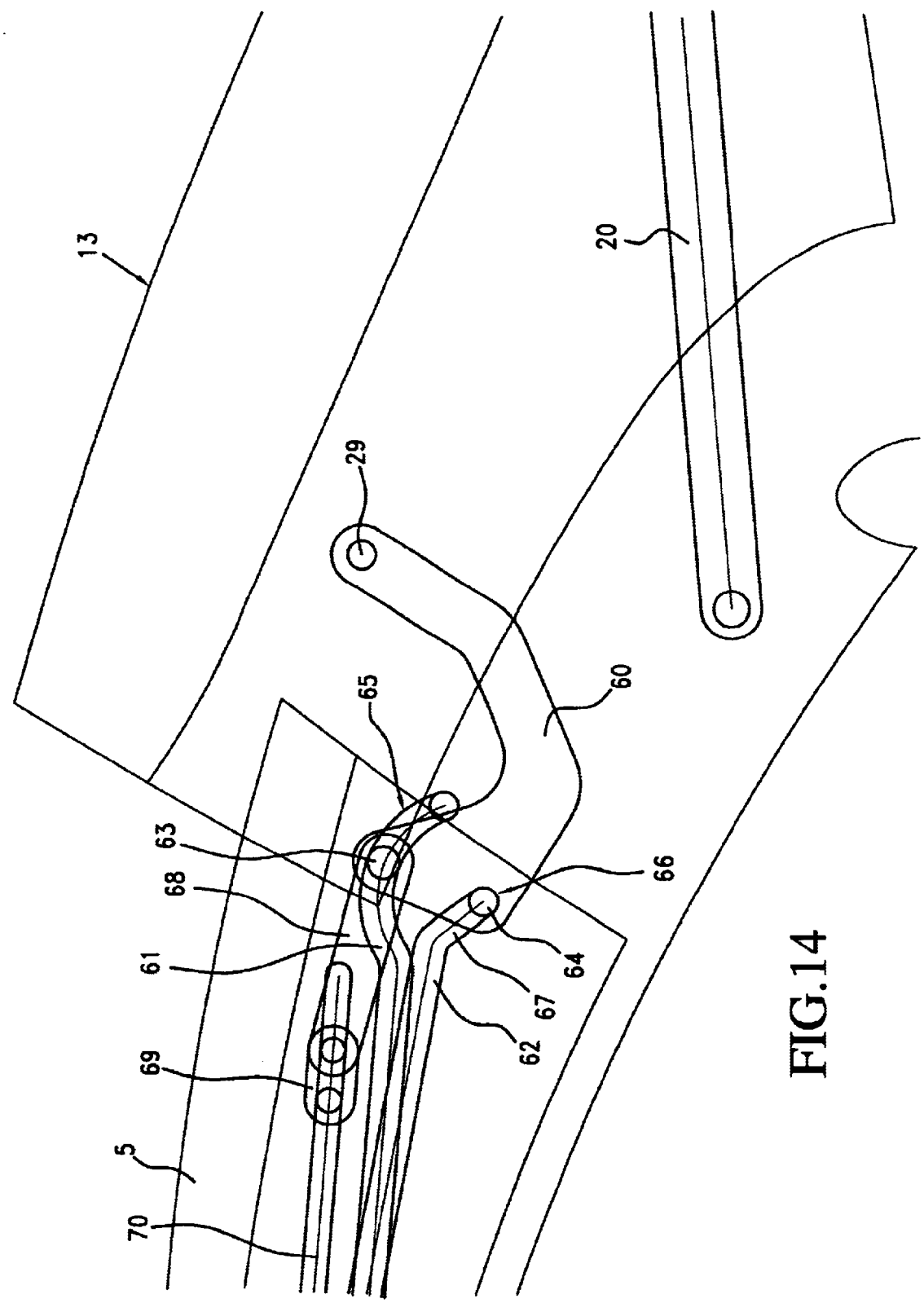
FIG. 14 is an enlarged side view of the bearing means shown in FIG. 13 when the rear roof part is being raised.

The third embodiment of the bearing means (see FIGS. 13 & 14) contains a raising lever 60 which is movably guided on two lengthwise guides 61, 62, of a guide means which is attached to the front roof part 5 by means of two bearing parts 63, 64, for example, bearing pins which are guided to slide and which are spaced apart from one another on the raising lever 60. The lengthwise guide 61 on which the bearing part 63, which can be driven via a drive cable, is held has a rear end section 65 which is curved in the shape of a circle segment having a center of its circle which is located at the end point 66 of the end section 67 of the second lengthwise guide 62, which section is located below it. The end section 67 of the second lengthwise guide 62 runs at an angle such that, with the initial drive motion of the bearing part 63 in the end section 65, the raising lever 60 is first only pivoted up, since the second bearing part 64 still remains at the end point 66 until the driven bearing part 63 passes from the end section 67 into the lengthwise section of guide 62, and then, pulls the second bearing part 64 out of the end section 65. The raising lever 60 is pushed forward in the pivoted-up position, the paths of the first and second lengthwise guide 61, 62, determining the position of the raising lever 60.

Driving of the raising lever 60 and of the driven bearing part 63 takes place, for example, via a drag lever 68 which is pivotally supported on the drive carriage 69 and is pivotally connected to the top bearing part 63 on the raising lever 60. The drive carriage 69 is movably supported on the drive guide 70 and is connected to the drive cable.

The raising motion of the rear roof part 13 takes place according to the preceding examples.

Figure 15:
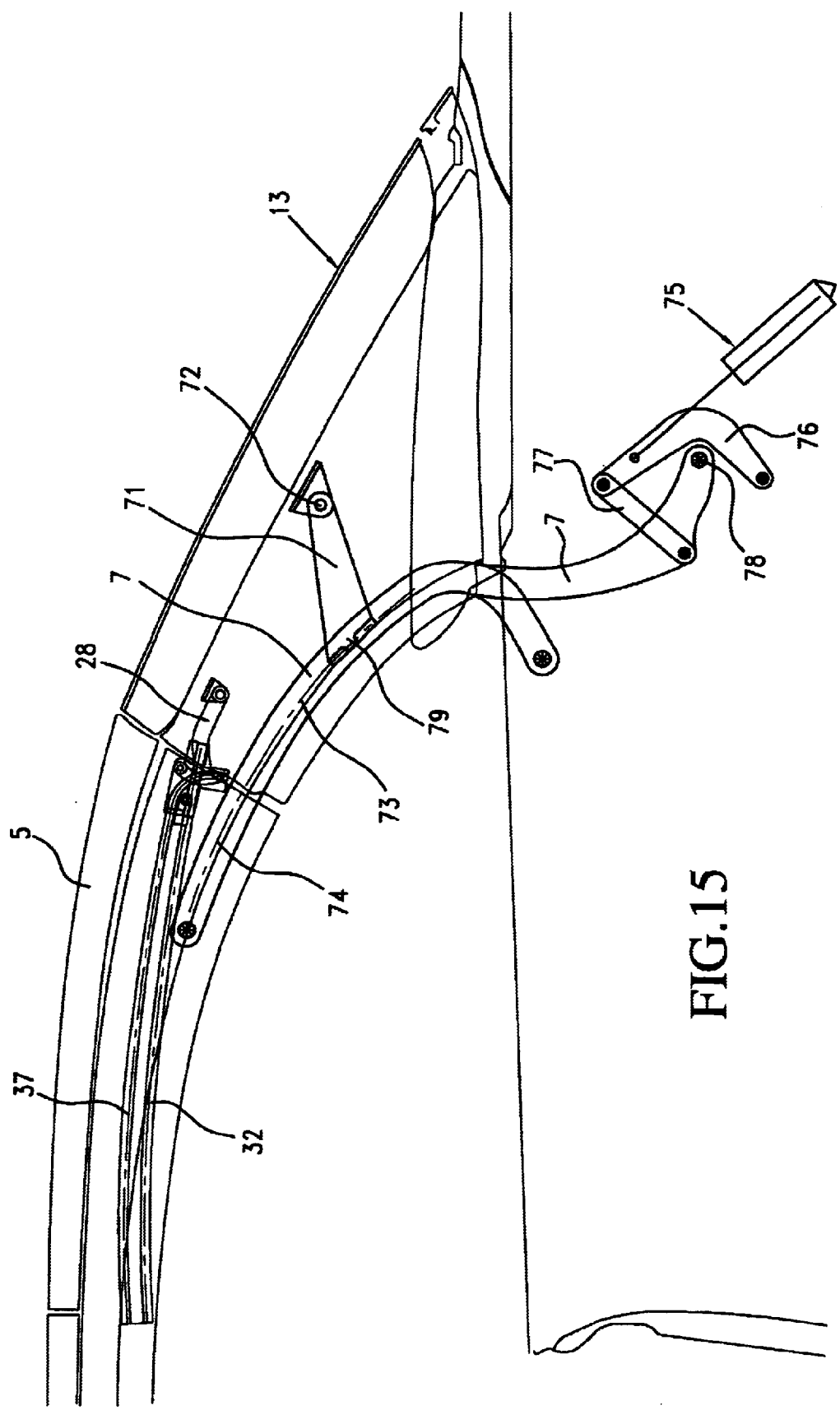
FIG. 15 is a side view of a portion of the motor vehicle roof shown in FIG. 1 in the closed position with another embodiment of the rear bearing means for the rear roof part.
Figure 16:
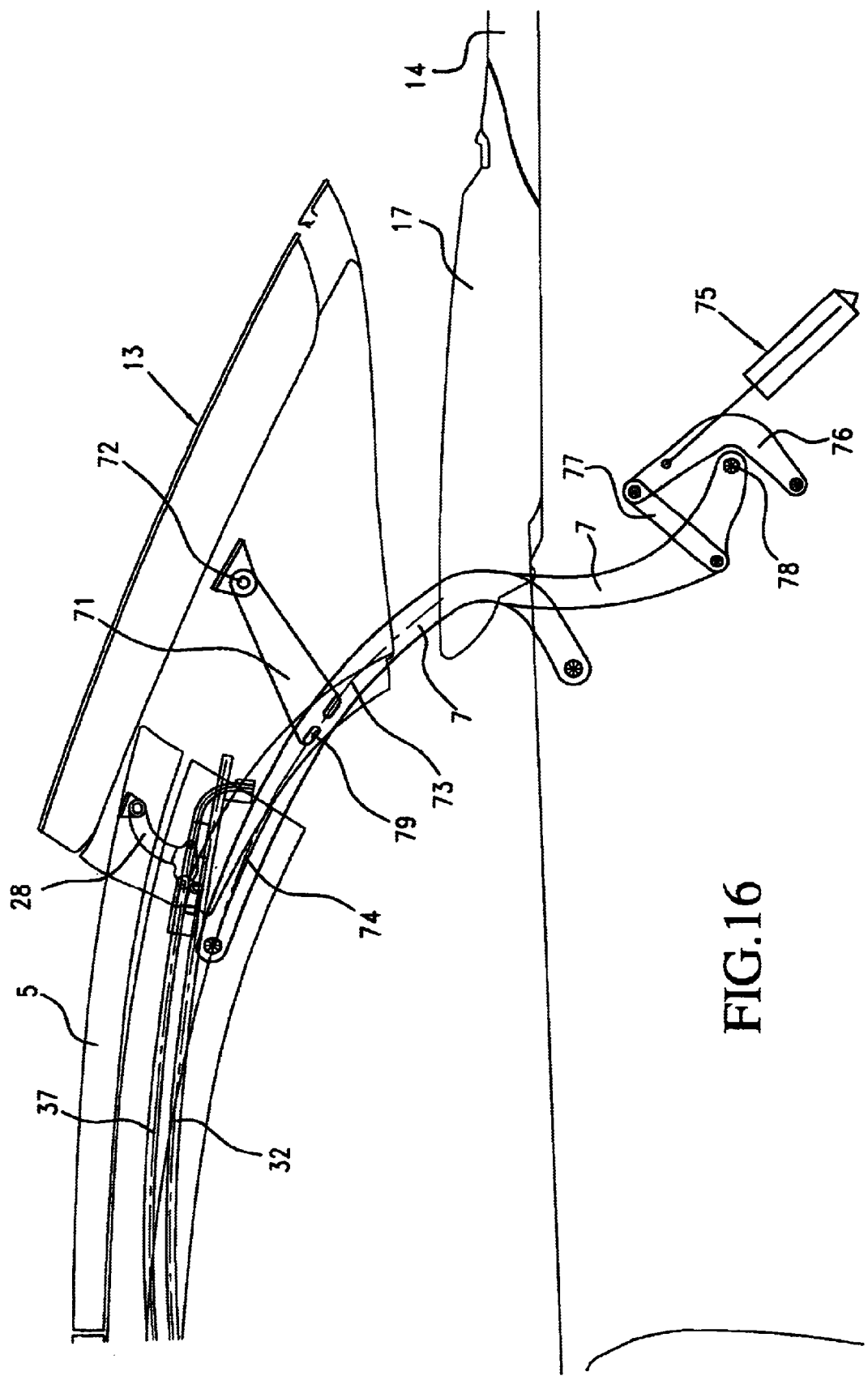
FIG. 16 is a side view showing the bearing of FIG. 15 when the rear roof part is being raised.

One alternative embodiment of the bearing means contains, instead of the connecting rod 20 of the rear support for the rear roof part 13, a support lever 71 (see FIGS. 15 & 16) which is pivotally connected, at one end, to the rear roof part 13 at a joint 72, and at the other end, is supported to be able to move lengthwise on a rear guide rail 73. The rear guide rail 73 is located on the main connecting rod 7. The front guide rail 74 is attached to the front roof part 5 and the side member 9, and in the position as shown in FIG. 15, adjoins the rear guide rail 73 so that, when the rear roof part 13 is moved over the front roof part 5, the support lever 71 enters the front guide rail 74. Thus, the support lever 71 has no connection to the main connecting rod 7 when the latter is pivoted around the body-mounted main bearing 78 via a hydraulic cylinder 75 and two intermediate levers 76, 77, for stowing the front roof part 5. The lengthwise slide guide 79 at the foot of the support lever 71 forms a stable guide and support for the rear roof part 13.

Figure 17:
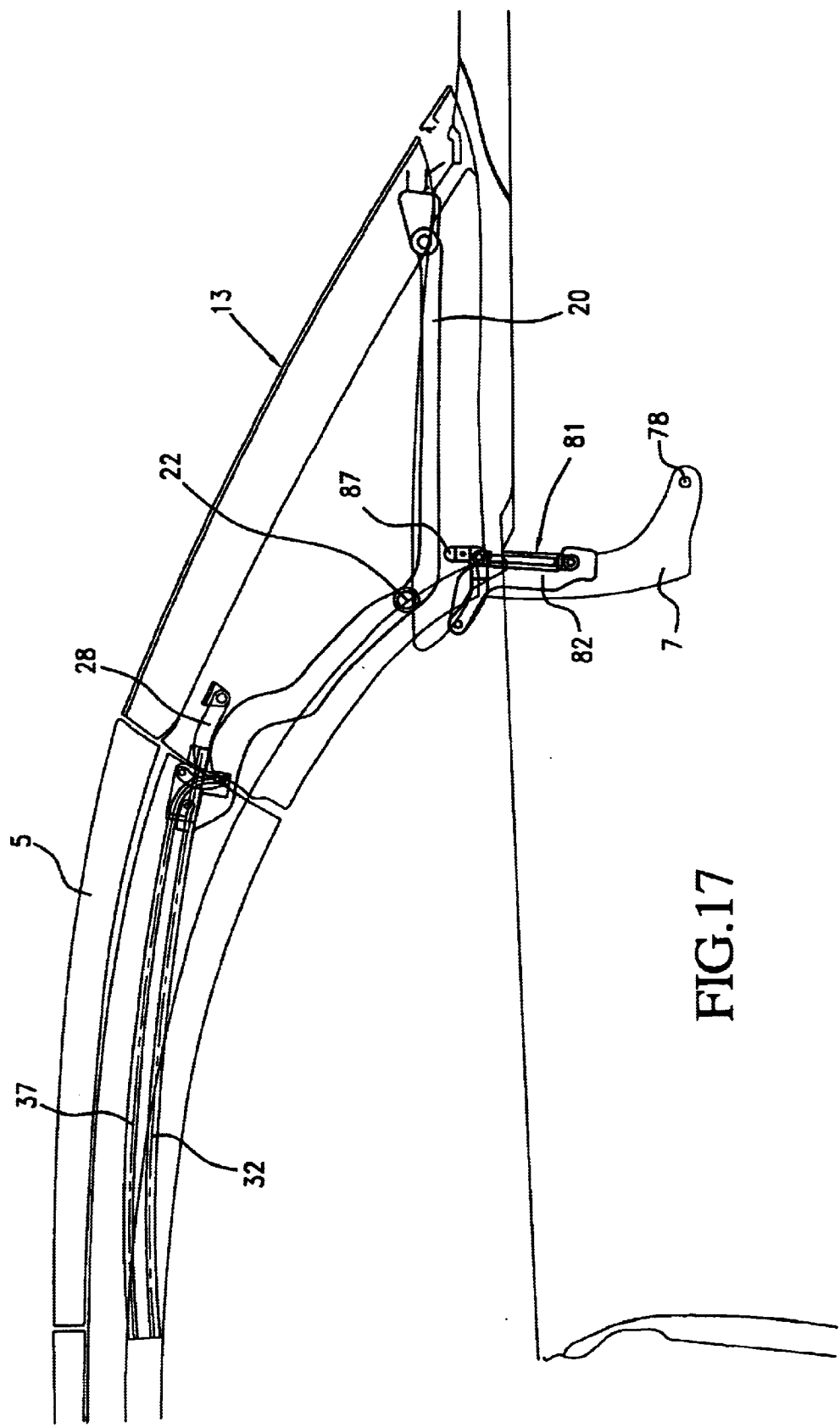
FIG. 17 is a side view showing a portion of the motor vehicle roof shown in FIG. 1 in the closed position with a gas pressure spring element for equalizing the weight of the rear roof part.
Figure 18:
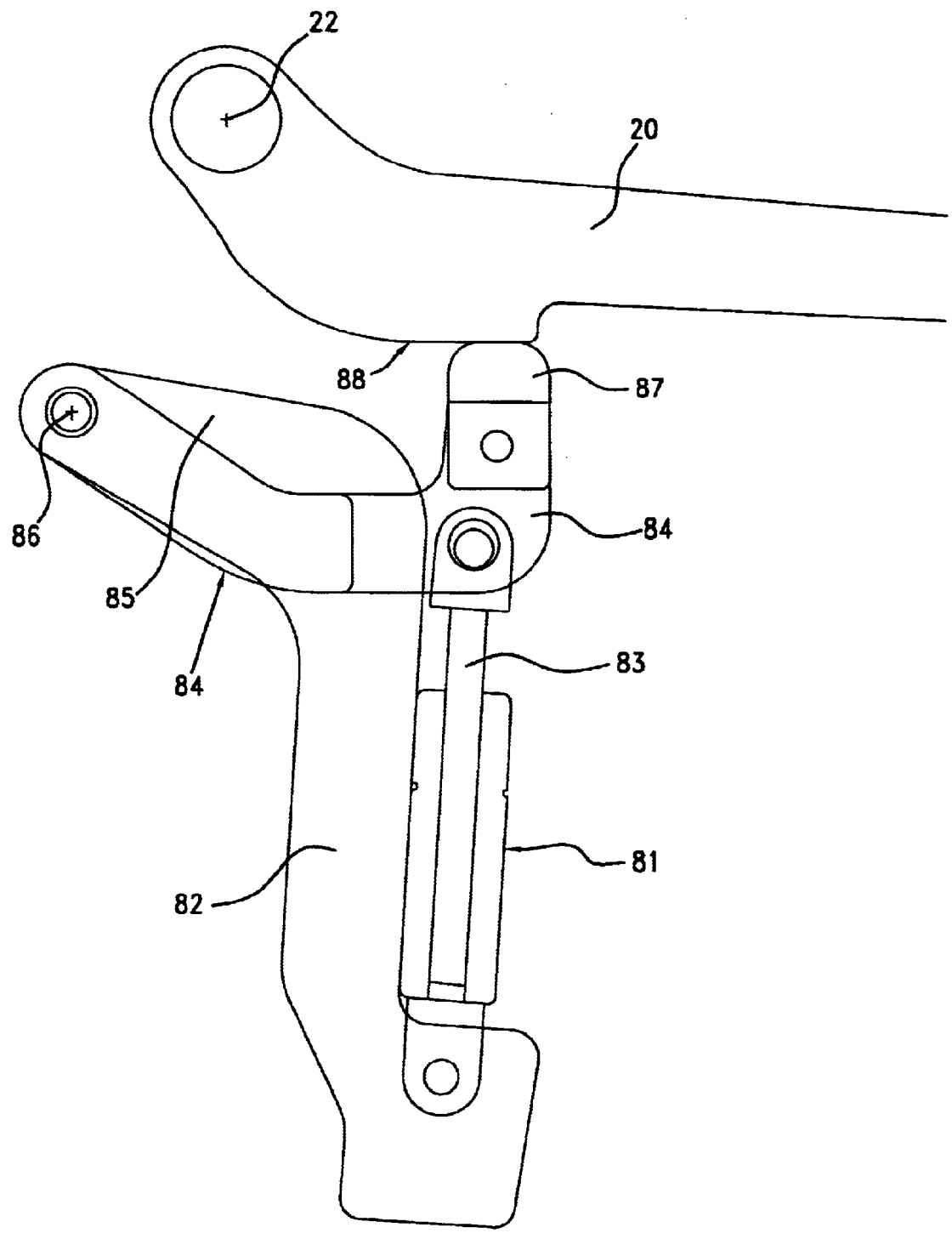
FIG. 18 is an enlarged side view of the gas pressure spring element shown in FIG. 17.

A raising aid (see FIGS. 17 & 18) for the rear roof part 13 contains a gas pressure spring element 81 which is supported at one end on the mounting plate 82 and at the other end is connected by its telescoping lifting rod 83 to the drag lever 84 which is pivotally mounted at a joint 86 on a lateral projection 85 of the mounting plate 82. The free end of the drag lever 84 carries a sliding body 87 which supportingly engages the sliding support surface 88 on the connecting rod 20 which runs from the vicinity of the pivot bearing 22. The mounting plate 82 is securely mounted on the main connecting rod 7 (shown in FIG. 17 and also, see, for example, FIG. 15) and can be lowered with it when the front roof part 5 is lowered into the compartment 3. The pre-tensioned gas pressure spring element 81 reduces the force necessary for swinging up the rear roof part 13 by accommodating the weight of the rear roof part 13. The gas pressure spring element 81 can be used in each of the described embodiments with the connecting rod 20.

What is claimed is:

1. A convertible motor vehicle having a body and a convertible roof, the convertible roof comprising
    at least one front roof part which is movably supported on said body vehicle by a bearing arrangement,
    a rear roof part which is movable over the at least one front roof part and is lowerable with said at least one front roof part into a rear stowage space,
    a raising mechanism for raising a front side of the rear roof part over the front roof part, said raising mechanism being movably supported on a lengthwise guide mechanism which is located on the front roof part, and
    a connecting rod,
    wherein the rear roof part is supported in the rear by the connecting rod to pivot supported on at least one of the at least one front roof part and a bearing of the front roof part.

2. Motor vehicle roof as claimed in claim 1, wherein the rear roof part has a rear window and one of side roof members and C columns.

3. A convertible motor vehicle according to claim 1, further comprising
    a guide rail and a support lever movably supported on the guide rail,
    wherein the rear roof part is supported by a pivot joint on the support lever.

4. Motor vehicle roof as claimed in claim 3, wherein the guide rail comprises a front guide rail on the front roof part and into a rear guide rail on a main column which movably supports the front roof part.

5. A convertible motor vehicle according to claim 1,
    wherein the raising mechanism comprises a raising lever which is pivotally connected to the rear roof part,
    wherein a carriage is guided by the lengthwise guide mechanism, and
    wherein the raising lever is pivotably and movably supported by the carriage.

6. A convertible motor vehicle having a body and a convertible roof, the convertible roof comprising
    at least one front roof part which is movably supported on said body vehicle by a bearing arrangement,
    a rear roof part which is movable over the at least one front roof part and is lowerable with said at least one front roof part into a rear stowage space,
    a raising mechanism for raising a front side of the rear roof part over the front roof part, said raising mechanism being movably supported on a lengthwise guide mechanism which is located on the front roof part,
    wherein the raising mechanism comprises a raising lever which is pivotally connected to the rear roof part and has a control pin that is guided in a control guide on the front roof part
    wherein a carriage is guided by the lengthwise guide mechanism,
    wherein the raising lever is pivotably and movably supported by the carriage, and
    wherein the control pin is connected to a drag lever which drives it and which is pivotally supported on the carriage.

7. Motor vehicle roof as claimed in claim 5, wherein a pivot bearing connecting the raising lever to the carriage is movably supported for executing a lengthwise equalization motion for positionally equalizing the raising mechanism at right and left sides of the roof.

8. Motor vehicle roof as claimed in claim 6, wherein the control pin is located in an end section of the control guide when the control pin is at a dead center position with reference to the carriage.

9. A convertible motor vehicle having a body and a convertible roof, the convertible roof comprising
    at least one front roof part which is movably supported on said body vehicle by a bearing arrangement,
    a rear roof part which is movable over the at least one front roof part and is lowerable with said at least one front roof part into a rear stowage space, and
    a raising mechanism for raising a front side of the rear roof part over the front roof part, said raising mechanism being movably supported on a lengthwise guide mechanism which is located on the front roof part,
    wherein a drive motor is mounted on the front roof part and is connected to a carriage of the raising means at each side on the front roof part via a respective drive cable.

10. A convertible motor vehicle having a body and a convertible roof, the convertible roof comprising
    at least one front roof part which is movably supported on said body vehicle by a bearing arrangement,
    a rear roof part which is movable over the at least one front roof part and is lowerable with said at least one front roof part into a rear stowage space, and
    a raising mechanism for raising a front side of the rear roof part over the front roof part, said raising mechanism being movably supported on a lengthwise guide mechanism which is located on the front roof part,
    wherein the lengthwise guide mechanism comprises two lengthwise guides,
    wherein the raising lever is movably supported by a bearing part in each of said lengthwise guides,
    wherein the raising lever is pivotally connected to the rear roof parts, and
    wherein a raising section of a first of the lengthwise guides is configured for producing an initial pivoting motion of the raising lever.

11. Motor vehicle roof as claimed in claim 10, wherein the bearing part in the first lengthwise guide is driven; and wherein the raising section has an arcuate shape.

12. Motor vehicle roof as claimed in claim 11, wherein a drag lever is provided for driving the bearing part which is driven.

13. Motor vehicle roof as claimed in claim 12, wherein the drag lever is connected to a drive motor via a drive cable and a drive carriage which is movably guided in a drive guide.

14. A convertible motor vehicle having a body and a convertible roof, the convertible roof comprising
    at least one front roof part which is movably supported on said body vehicle by a bearing arrangement, a rear roof part which is movable over the at least one front roof part and is lowerable with said at least one front roof part into a rear stowage space, a raising mechanism for raising a front side of the rear roof part over the front roof part, said raising mechanism being movably supported on a lengthwise guide mechanism which is located on the front roof part, and a means for relieving the weight for the rear roof part wherein the means for relieving the weight is a gas pressure spring element which is located on the main connecting rod which movably supports the front roof part.

15. Motor vehicle roof as claimed in claim 14, wherein the gas pressure spring element engages a connecting rod of the rear roof part.

* * * * *